(12) United States Patent
Fujii et al.

(10) Patent No.: US 12,728,477 B2
(45) Date of Patent: Sep. 8, 2026

(54) LINEAR FRICTION-JOINING METHOD AND LINEAR FRICTION-JOINING STRUCTURE

(71) Applicant: OSAKA UNIVERSITY, Osaka (JP)

(72) Inventors: Hidetoshi Fujii, Osaka (JP); Yoshiaki Morisada, Osaka (JP); Yasuhiro Aoki, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 80 days.

(21) Appl. No.: 18/284,426

(22) PCT Filed: Mar. 18, 2022

(86) PCT No.: PCT/JP2022/012817
§ 371 (c)(1),
(2) Date: Sep. 27, 2023

(87) PCT Pub. No.: WO2022/210048
PCT Pub. Date: Oct. 6, 2022

(65) Prior Publication Data

US 2024/0157467 A1 May 16, 2024

(30) Foreign Application Priority Data

Mar. 31, 2021 (JP) ................................ 2021-061057

(51) Int. Cl.
*B23K 20/00* (2006.01)
*B23K 20/12* (2006.01)
(Continued)

(52) U.S. Cl.
CPC ...... *B23K 20/1205* (2013.01); *B23K 2103/04* (2018.08); *B23K 2103/12* (2018.08)

(58) Field of Classification Search
CPC .. B23K 20/12; B23K 20/1205; B23K 20/129; B23K 20/22; B23K 2103/04; B23K 2103/18
See application file for complete search history.

(56) References Cited

U.S. PATENT DOCUMENTS 4,346,918 A * 8/1982 Lycan .................... F16L 13/04 228/101
H82 H * 7/1986 Dittrich .................. F41A 21/02 138/155
(Continued)

FOREIGN PATENT DOCUMENTS

JP 2016134402 A * 7/2016 .......... B23K 20/122

OTHER PUBLICATIONS

JP2016134402A computer english translation (Year: 2016).*
WO2018143335A1 computer english translation (Year: 2018).*

*Primary Examiner* — Erin B Saad
(74) *Attorney, Agent, or Firm* — RANKIN, HILL & CLARK LLP

(57) ABSTRACT

Provided are an easy and efficient linear friction-joining method with which it is possible to form an excellent joined section between materials being joined that are of different sizes and shapes, and a linear friction-joining structure obtained through the aforementioned friction-joining method. The present invention discloses a linear friction-joining method characterized by having a first step for bringing an end surface of one member into contact with an end surface of another member to form a joining interface, a second step for repeatedly causing the one member and the other member to slide on the same trajectory in a state in which pressure is applied roughly perpendicularly to the joining interface and eliminating burrs from the joining interface, and a third step for stopping the sliding and forming a joined surface, the linear friction-joining method also being characterized in that the end surface of the one member and the end surface of the other member have different surface areas, and in that the protrusion length of the member having the lesser surface area is set equal to or greater than the upset distance.

10 Claims, 7 Drawing Sheets

(51) Int. Cl.
*B23K 103/04* (2006.01)
*B23K 103/12* (2006.01)

(56) References Cited

U.S. PATENT DOCUMENTS

| | | | | |
|---|---|---|---|---|
| 5,697,545 | A * | 12/1997 | Jennings | B23K 20/10 156/580.2 |
| 5,865,364 | A * | 2/1999 | Trask | B23K 20/129 228/44.3 |
| 6,295,893 | B1 * | 10/2001 | Ogawa | F01L 1/047 123/90.6 |
| 7,988,032 | B2 * | 8/2011 | Bass | B23K 20/12 228/2.1 |
| 8,002,162 | B2 * | 8/2011 | Bayer | B23K 20/129 228/2.1 |
| 8,651,361 | B1 * | 2/2014 | Daroff | B23K 20/12 228/114.5 |
| 8,777,089 | B2 * | 7/2014 | Beech | B23K 20/12 228/2.1 |
| 9,067,279 | B1 * | 6/2015 | Shuaib | B23K 20/126 |
| 10,022,816 | B2 * | 7/2018 | Okada | B23K 20/12 |
| 10,071,440 | B2 * | 9/2018 | Shibata | F03C 1/06 |
| 10,315,264 | B2 * | 6/2019 | Cui | B23K 1/0018 |
| 10,625,370 | B2 * | 4/2020 | Bray | B23K 20/22 |
| 10,632,563 | B2 * | 4/2020 | Bray | B23K 20/12 |
| 11,465,230 | B2 * | 10/2022 | Nakaya | B23B 11/00 |
| 11,707,797 | B2 * | 7/2023 | Kitakaze | B23Q 17/2283 228/44.5 |
| 2003/0168494 | A1 * | 9/2003 | Halley | B23K 20/129 228/112.1 |
| 2004/0112941 | A1 * | 6/2004 | Slattery | B29C 66/8322 228/112.1 |
| 2005/0274010 | A1 * | 12/2005 | Rawson | B23P 6/005 29/889.7 |
| 2008/0000558 | A1 * | 1/2008 | Yang | C22F 1/183 148/527 |
| 2010/0119870 | A1 * | 5/2010 | Nojiri | B23K 20/2333 228/114.5 |
| 2017/0050264 | A1 * | 2/2017 | Glazebrook | B23K 20/2336 |
| 2018/0214974 | A1 * | 8/2018 | Fujii | F16B 5/08 |
| 2018/0339361 | A1 * | 11/2018 | Matsuyama | B23K 20/24 |
| 2021/0129263 | A1 * | 5/2021 | Fujii | B23K 20/12 |
| 2022/0371120 | A1 * | 11/2022 | Fujii | B23K 20/16 |
| 2024/0139859 | A1 * | 5/2024 | Jiang | B23K 20/129 |
| 2024/0157467 | A1 * | 5/2024 | Fujii | B23K 20/1205 |
| 2024/0293888 | A1 * | 9/2024 | Fujii | B23K 20/00 |

* cited by examiner

Front surface

Back surface

LINEAR FRICTION-JOINING METHOD AND LINEAR FRICTION-JOINING STRUCTURE

TECHNICAL FIELD

The present invention relates to a linear friction-joining method for solid-phase joining metal materials and a linear friction-joined structure obtained by the linear friction-joining method.

BACKGROUND ART

With the increase in strength of metal materials such as steel and aluminum alloys, the decrease in strength at the joined portion that determine the mechanical properties of the joined structure has become a serious problem. On the other hand, in recent years, attention has been paid to a solid phase joining method in which the maximum temperature reached during joining does not reach the melting point of the material to be joined and the decrease in strength at the joined portion is smaller than that of conventional melt welding, and it is rapidly progressing to put into practical use.

In particular, the linear friction welding (LFW: Linear Friction Welding), in which metal members are slid together in a linear trajectory, does not require the use of a tool, unlike the friction stir welding (FSW: Friction Stir Welding), can be easily applied to metals having a high melting temperature, and is expected to be put to practical use in various industries.

However, since the materials, shapes, and sizes of the materials to be joined that are the target of the linear friction-joining are various, the appropriate joining conditions and joining mechanisms for each combination of materials to be joined have not been clarified, and the actual situation is that optimization is performed based on a large number of preliminary tests and experiences, and the like.

On the other hand, for example, Patent Literature 1 (Japanese Patent Unexamined publication No. 2015-164738) discloses a friction-joining apparatus for friction-joining one member to the other member wherein, in a state that the one member is brought into contact with the other member, the both members are repeatedly moved relative to each other on the same trajectory, which is characterized by providing a stopping means which, according to a command to stop the relative movement of the one member having respect to the other member, stops the relative movement of the one member to the other member during a period of time from the generation of the stopping command to one relative movement of the one member having respect to the other member on the trajectory.

In the friction-joining apparatus described in Patent Literature 1, it is said that when the one member is brought into contact with the other member and is friction-joined by repeatedly moving them relative to each other on the same trajectory, it is possible to easily specify the timing of the generation of the stopping command of the relative movement at which timing the relative movement of the two members will just stop at the timing when the two members will be in an appropriate joined state.

PRIOR ART REFERENCE

Patent Reference

Patent Literature 1: Japanese Patent Unexamined Publication No. 2015-164738

SUMMARY OF THE INVENTION

Problem to be Solved by the Invention

The object of the linear friction-joining is not limited to the butt-joining of the same materials to be joined, but there are many cases where joining of the materials to be joined of different sizes and shapes or joining of different materials is required. However, in these linear friction-joining, the joining phenomenon is more complicated than in the butt-joining of the materials to be joined having the same size, shape and material, and it is extremely difficult to find the joining conditions for forming a good joint.

The friction-joining method disclosed in the above Patent Literature 1 shortens the period from the generation of the stopping command to stopping of the actuator, and controls the amount of friction-joining. Although it contributes to the sophistication of basic joining process control of the linear friction-joining, it does not show a suitable joining method for linear friction-joining of materials to be joined having different sizes and shapes.

In view of the problems in the prior art as described above, an object of the present invention is to provide a simple and efficient linear friction-joining method capable of forming good joined portions with respect to the materials to be joined having different sizes, shapes and the like, and a linear friction-joined structure obtained by the linear friction-joining method.

Means to Solve the Problems

In order to achieve the above object, the present inventors have done intensive study as to linear friction-joining conditions for materials to be joined having different sizes and shapes, and have found the fact that the relation between the "protrusion length" and the "upset distance" which have not been focused as the linear friction-joining conditions is extremely important, and reached the present invention.

Namely, the present invention provides a linear friction-joining method which comprises:

a first step of forming an interface to be joined by bringing an end surface of one member into contact with an end surface of the other member while applying a pressure substantially perpendicular to the interface to be joined;

a second step of repeatedly sliding the one member and the other member on the same trajectory to discharge burr from the interface to be joined; and a third step of stopping the sliding to form a joined surface;

wherein the end surface of the one member and the end surface of the other member have different areas, and the protrusion length of the member having the smaller area is equal to or larger than the upset distance.

In the linear friction-joining, the materials to be joined (one member and the other member) are strongly fixed to a linear friction-joining apparatus by a fixing jig or the like. Here, the region of the material to be joined that is restrained by the fixing jig is suppressed from being deformed or flexed even in the state of being vibrated in the second step. The "protrusion length" in the linear friction-joining conditions means the length of the material to be joined protruding outside (to the side of the interface to be joined) from the fixing jig. Further, generally, the position of the fixing jig is constant, but in the case that the position of the fixing jig is variable depending on the joining situation, the position of the fixing jig at the start of joining should be used for judgment. Also, the "upset distance" is an amount indicating how much the total length of the one member and the other member is shortened in the direction in which the joining pressure is applied after all steps of the linear friction-joining are completed.

When the materials having the same shape are butt together for the linear friction-joining, the amount of heat introduced in the vicinity of the interface to be joined and the stress applied during the joining are approximately the same between the one member and the other member, the upset distance is determined by contributing the changes in one member and the other member equally. On the other hand, as a result of extensive studies by the inventors of the present invention, it has been made clear that the joining was achieved basically by the discharge of the burr from the member having the smaller end surface area which forms the butt surface, and almost no burr is discharged from the member having the larger end surface area. That is, since the upset distance is determined by the member having the smaller area between the end surfaces to be brought into contact with, it is necessary to make the protrusion length of the member equal to or larger than the upset distance. When the protrusion length of the member having the smaller end surface area is set to be less than the upset distance, the desired upset distance cannot be realized, and a good joined interface cannot be formed.

Here, it is preferable that the value of the upset distance is set to a small value as long as a sufficient amount of burr for forming a new surface on the entire area of the interface to be joined can be discharged. Increase in the upset distance means increase in the amount of decrease in the material to be joined, which is not appropriate from the viewpoint of effectively utilizing the material to be joined.

In addition, the minimum value of the protrusion length of the member having the smaller end surface area is determined by an appropriate upset distance required for forming the new surface, and the value is preferably set to as small as possible. By setting the protrusion length to a small value, the vibration of the linear friction-joining apparatus and the vibration in the vicinity of the interface to be joined can be matched more accurately (the set joining conditions can be accurately realized). On the other hand, when the protrusion length is set to a large value, the influence of deflection and the like becomes large, and the difference between the set joining conditions and the phenomenon actually occurring in the vicinity of the interface to be joined becomes large.

In the linear friction-joining method of the present invention, it is preferable that the amount of burr discharged in the direction substantially perpendicular to the sliding direction is larger than the amount of burr discharged in the direction substantially parallel to the sliding direction. In linear friction-joining, the relationship between the direction of burr discharge and the amount of burr discharge has not been clarified, when the end surface of the one member and the end surface of the other member have different surface areas, by making the amount of burr discharged in the direction substantially perpendicular to the sliding direction larger than the amount of burr discharged in the direction substantially parallel to the sliding direction, a good joined interface can be efficiently formed.

When the end surface of the one member and the end surface of the other member have different surface areas, burr is discharged from the member having the smaller end surface area, as described above. Here, in the member having the smaller end surface area, the end surface during linear friction-joining tends to move in an arc in the sliding direction, and the joining pressure between the upper end and the lower end tends to decrease (joining pressure between the center edge and the outer edge being different). On the other hand, in the direction substantially parallel to the sliding direction, although the absolute value of the joining pressure at the upper end and the lower end tends to be smaller, the same degree of joining pressure is applied from the center to the outer edge. Since smooth discharge of burr requires continuous material flow from the center to the outer edge of the interface to be joined, the discharge amount of burr in the direction substantially perpendicular to the sliding direction becomes larger than the discharge amount of burr in the substantially parallel direction. Further, by intentionally and stably forming this state, it is possible to efficiently obtain a good linear friction-joined joint.

Further, in the linear friction-joining method of the present invention, it is preferable that, with respect to the member having the smaller end surface area, the length in the direction substantially perpendicular to the sliding direction is made shorter than the length in the direction substantially parallel to the sliding direction. With respect to the member having the smaller end surface area, when the length in the direction substantially perpendicular to the sliding direction is made shorter than the length in the direction substantially parallel to the sliding direction, it is possible to more reliably realize the state that “the discharge amount of burr in the direction substantially perpendicular to the sliding direction becomes larger than the discharge amount of burr in the substantially parallel direction”. As a result, the area of the joined interface can be efficiently enlarged.

Further, in the linear friction-joining method of the present invention, it is preferable that a thermal conductivity of the one member and/or the other member is 10 W/mK or more. When the thermal conductivity of the material to be joined is high, the burr discharged from the member having the smaller end surface area is more remarkably, and the relationship between the protrusion length and the upset distance of the member having the smaller end surface area becomes more direct. In addition, when the thermal conductivity of the material to be joined is high, since the temperature of the material to be joined tends to rise in the wide range due to heat conduction of frictional heat, the strength of the entire material to be joined tends to decrease. As a result, since it is difficult to generate the vibration of the linear friction-joining apparatus at the interface to be joined, the determination of the protrusion length becomes more important. On the other hand, when the thermal conductivity is low like a titanium alloy, since only the vicinity of the interface to be joined is locally heated by frictional heat, the degree of freedom of the protrusion length increases.

Further, in the linear friction-joining method of the present invention, it is preferable that the one member and/or the other member is any one of ferrous metals, aluminum, aluminum alloys, magnesium, magnesium alloys, copper and copper alloys. Although these metal materials have higher thermal conductivity than titanium alloys, which have been studied as materials to be joined by linear friction-joining, and are difficult to join by linear friction-joining, a good joint can be produced efficiently by using the linear friction-joining method of the present invention. Further, each metal material is an important structural metal material, and the linear friction-joined joint can be used for various purposes.

Further, in the linear friction-joining method of the present invention, it is preferable that the protrusion length is equal to or greater than the sum of the upset distance and the thickness of the burr. Since the burr is formed around the joined interface, when the protrusion length of the member having the smaller end surface area is equal to or greater than the sum of the upset distance and the thickness of the burr, it is possible to prevent the interference between the fixing jig for fixing the material to be joined onto the linear friction-joining apparatus and the burr. On the other hand, as long as the effect of the present invention is not impaired, for the purpose of crushing the burr with the fixing jig or the like, it may be intentionally set to satisfy the condition of "sum of upset distance and thickness of burr>protrusion length≥upset distance". The "thickness of burr" in the sum of upset distance and thickness of burr>protrusion length≥upset distance" means the thickness of the burr when it is not crushed by the fixing jig or the like.

Further, in the linear friction-joining method of the present invention, it is preferable that the one member and the other member are made of different materials. The linear friction-joining method of the present invention can also be suitably used for joining dissimilar materials, and by combining various metal materials, it is possible to reduce the weight and increase the strength of the metal structure.

Further, in the linear friction-joining method of the present invention, it is preferable that the materials of the one member and the other member are selected so that the strength of the member having the smaller area is low at a desired joining temperature. By making the strength of the member having the smaller area lower, the burr can be more reliably discharged only from the member, and the joining conditions of the linear friction-joining method of the present invention can be precisely applied.

Furthermore, in the linear friction-joining method of the present invention, it is preferable that the pressure is set to be equal to or higher than the yield stress and equal to or lower than the tensile strength of the one member and/or the other member at a desired joining temperature. When setting the joining pressure of the linear friction-joining to be equal to or higher than the yield stress and equal to or lower than the tensile strength of the one member and/or the other member at a desired joining temperature, the joining temperature can be accurately controlled. In particular, in the linear friction-joining of the present invention, since the setting values such as amplitude and frequency can be accurately reflected in actual joining conditions, the joining temperature can be controlled more reliably.

For example, when the applied pressure in the linear friction-joining is increased, the frictional heat increases, but, since the softened material becomes burr and is continuously discharged, the "junction temperature" is determined by the pressure to be applied to the softened material (pressure to discharge the burr). In other words, when the applied pressure is set to a high value, the material to be joined having a higher strength (state of high yield strength) can be discharged as burr. Here, since the "state of higher yield strength" means the "state of lower temperature", the "joining temperature" lowers as the applied pressure increases. Since the relationship between the yield strength and the temperature is substantially constant depending on the material, the joining temperature can be controlled very accurately.

Here, when the pressure is set to be equal to or higher than the yield stress of the material to be joined, the discharge of burr from the interface to be joined is started, and when the pressure is increased up to the tensile strength, the discharge of burr is accelerated. Similar to the yield stress, since the tensile strength at a specific temperature is substantially constant depending on the material to be joined, the joining temperature corresponding to the set pressure can be realized.

Further, the present invention also provides a linear friction-joined structure in which one member and the other member are integrated via a linear friction-joined interface;

wherein the end surface of the one member and the end surface of the other member which form the linear friction-joined interface have a different areas, and a thermal conductivity of the one member and/or the other member is 10 W/mK or more.

The linear friction-joined structure of the present invention is a linear friction-joined structure in which the members to be joined having different areas of end surfaces forming the joined portion are satisfactorily joined to each other. Further, it is characterized by including a member having a high thermal conductivity (10 W/mK or more), which generally makes the linear friction-joining difficult.

Further, in the linear friction-joined structure of the present invention, it is preferable that the one member and/or the other member is any one of ferrous metals, aluminum, aluminum alloys, magnesium, magnesium alloys, copper and copper alloys. The linear friction-joined structure of the present invention forms a good joined portion even when containing metal materials other than a titanium alloy which facilitates easy linear friction-joining.

Furthermore, in the linear friction-joined structure of the present invention, it is preferable that the area of the linear friction-joined interface is 70% or more of the area of the end surface of the member having the smaller area. When the end surface of the one member and the end surface of the other member which form the linear friction-joined interface have a different areas, although it is difficult to sufficiently enlarge the joined interface, since the joined interface having 70% or more of the area of the end surface of the member having the smaller area is formed, the strength and reliability of the joined portion are sufficiently ensured.

The linear friction-joined structure of the present invention can be suitably obtained by the linear friction-joining method of the present invention.

Effects of the Invention

According to the present invention, with respect to the members to be joined having different sizes and shapes, it is possible to provide an easy and efficient linear friction-joining method which forms the excellent joined portion, and a linear friction-joined structure obtained through the linear friction-joining method.

MODE FOR CARRYING OUT THE INVENTION

In the following, by referring the drawings, as the typical embodiments of the linear friction-joining method and the linear friction-joined structure of the present invention is explained in detail, but the present invention is not limited thereto. In the following explanation, the same symbol is given to the same or corresponding parts, and there is a case where overlapping explanation is omitted. In addition, since these drawings are presented to explain the concept of the present invention, there are cases where size and ratio of the structural elements are different from the real case.

(1) Linear Friction-Joining Method

Figure 1:
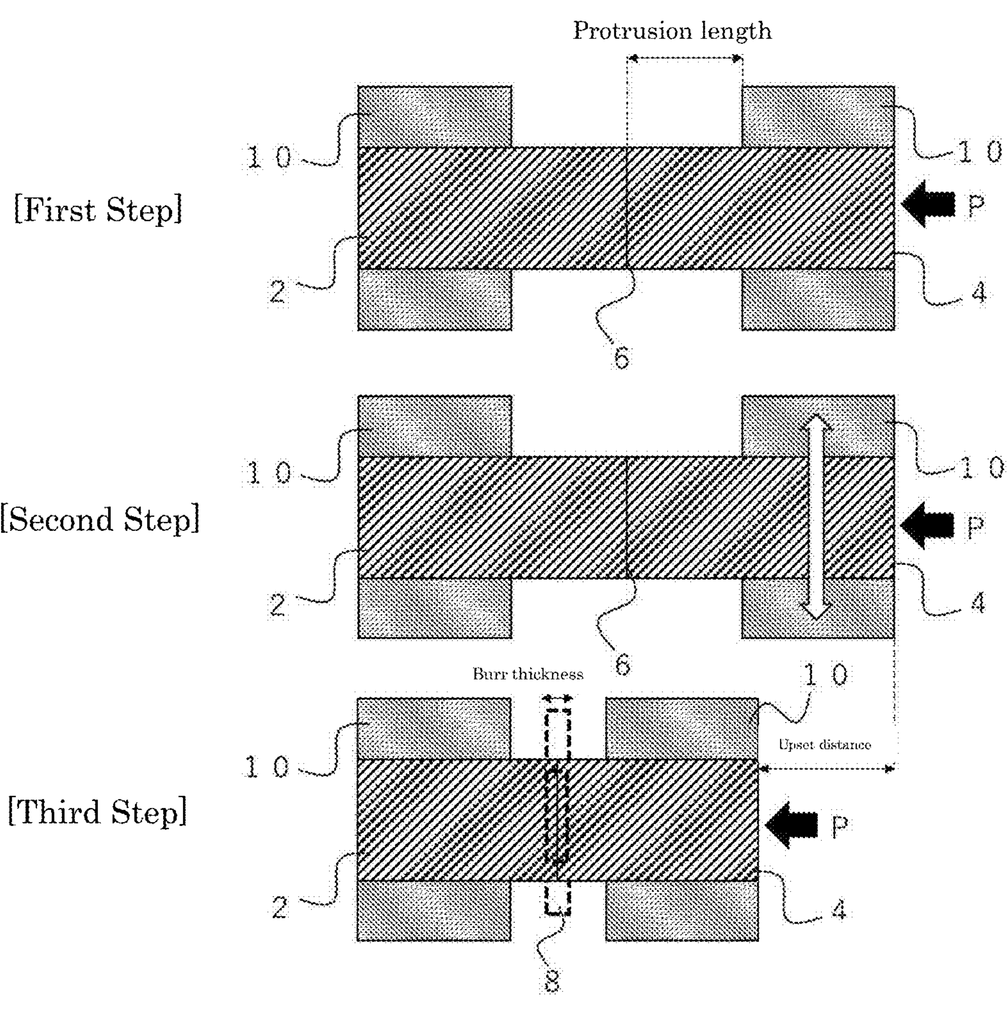
FIG. 1 is a schematic diagram which shows the state of the general linear friction-joining.

FIG. 1 is a schematic diagram which shows the state of general linear friction-joining. In the linear friction-joining, a solid-phase joining is achieved by using, as the main heat source, the frictional heat generated when the one member 2 and the other member 4 are linearly slid with a joining pressure P applied. Further, it is said that, by discharging the material softened by the temperature rise as burr 8 from the interface 6 to be joined, the oxide film formed on the interface 6 to be joined is removed, and the newly generated surfaces are brought into contact with each other to obtain the joined portion. The one member 2 and the other member 4 are fixed to a linear friction-joining apparatus by a fixing jig 10, and the protrusion length and the upset distance mean the lengths shown in the drawing.

Further, in the case of the butt-joining shown in FIG. 1, the burr 8 are discharged from the directions substantially parallel to and substantially perpendicular to the direction of sliding, and the one member 2 and the other member 4 are likewise shortened during the linear friction-joining process. That is, the upset distance can be set to the sum of the protrusion lengths of the one member 2 and the other member 4 as the upper limit. In addition, in FIG. 1, the second step shows the start of sliding, and burr is not shown. Further, in the third step, the burr 8 is indicated by a dotted line.

Figure 2:
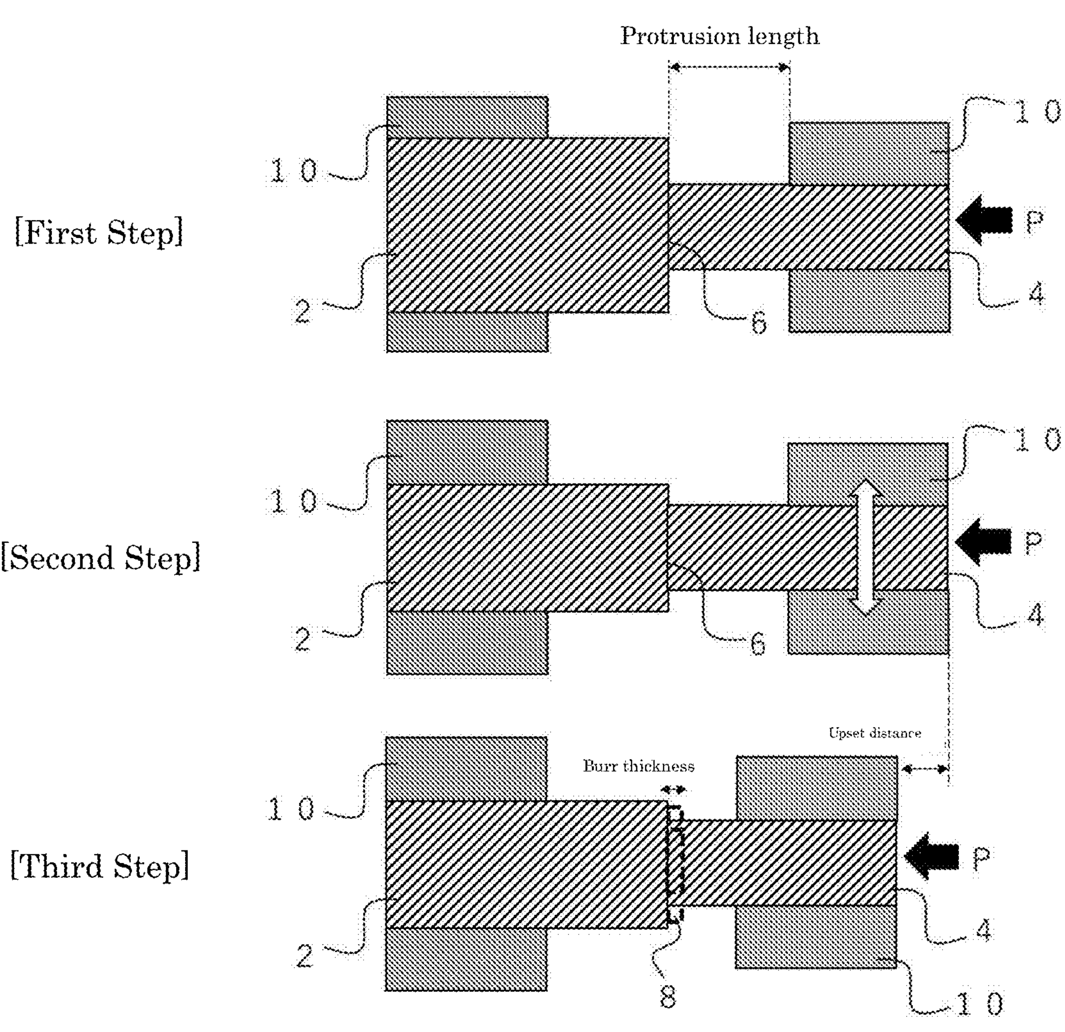
FIG. 2 is a schematic diagram which shows the state of the linear friction-joining of the present invention.

FIG. 2 is a schematic diagram which shows the state in the linear friction-joining of the present invention. In the linear friction-joining of the present invention, the one member 2 and the other member 4 have different shapes and/or sizes, and in the end surfaces forming the interface to be joined, the end surface of the one member 2 and the end surface of the other member 4 have different areas. FIG. 2 shows the case where the area of the end surface of the other member 4 is smaller.

Figure 3:
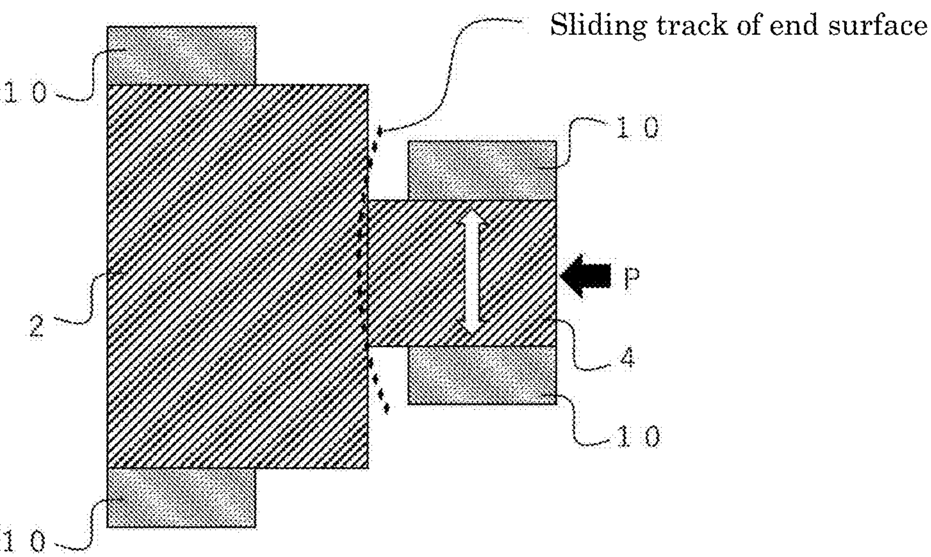
FIG. 3 is a schematic diagram which shows a sliding track of the member having a smaller end surface area.

When the end surface of the one member 2 and the end surface of the other member 4 have different areas, unlike the case of FIG. 1, the discharge of the burr 8 from the interface 6 to be joined is remarkably in the direction substantially perpendicular to the sliding direction. As shown in FIG. 3, in the other member 4 having the smaller end surface area, the end surface during the linear friction-joining tends to move in an arc in the sliding direction, and the joining pressure between the upper end and the lower end tends to decrease (joining pressure between the center edge and the outer edge being different). On the other hand, in the direction substantially parallel to the sliding direction, although the absolute value of the joining pressure at the upper end and the lower end tends to be smaller, the same degree of joining pressure is applied from the center to the outer edge. Since smooth discharge of burr 8 requires continuous material flow from the center to the outer edge of the interface 6 to be joined, the discharge amount of burr 8 in the direction substantially perpendicular to the sliding direction becomes larger than the discharge amount of burr 8 in the substantially parallel direction. Further, by intentionally and stably forming this state, it is possible to efficiently obtain a good linear friction-joined joint.

Further, the burr 8 are caused by the material flow from the other member 4 and are hardly discharged from the end surface of the one member 2. The reason why the discharge of the burr 8 from the one member 2 having the larger end surface area is hardly proceeded is not necessarily clear, but one of the reasons is considered that the removal of the frictional heat proceeds in the one member 2 having the larger end surface area, the temperature is difficult to rise compared to the other member 4. Further, another reason is considered that, in order to discharge the burr 8 from the end surface of the one member 2, it is necessary to push out the softened region, but this pushing out cannot be achieved by pressing the other member 4 which tends to become a higher temperature (that is, the strength is lowered) than the one member 2.

In the linear friction-joining of the present invention, since the burr 8 are discharged mainly from the other member 4, the protrusion length of the other member 4 must be set to a value equal to or greater than the upset distance at the time of joining. When the protrusion length is set to a value less than the upset distance, the fixing jig 10 abuts on the end surface of the one member 2 and a good joint cannot be formed.

Further, when the other member 4 is on the vibrating side and the one member 2 is on the fixed side, it is preferable that the protrusion length of the other member 4 is shortened as much as possible. By shortening the protrusion length, the vibration behavior of the end surface of the other member 4 accurately reflects the set frequency and amplitude, and the intended joined portion can be formed with good reproducibility. On the other hand, when the protrusion length is long, depending on the joining conditions, the other member 4 may be bent at the end of the fixing jig 10, and the end of the other member 4 in contact with the end of the one member 2 may not be almost vibrated not to proceed the desired friction phenomenon and the like.

The protrusion length of the other member 4 is preferably short, but when being too short, the formation of the new surfaces at the interface to be joined is insufficient, and it is not possible to obtain a good joined interface formed by the new surfaces coming into contact with each other. Here, in the linear friction-joining of the present invention, almost no burr 8 is discharged from the one member 2, but a good joined interface is formed, which is considered that, by repeatedly sliding the end of the other member 4, the oxide film on the outermost surface is removed to achieve a strong metallurgical joining.

Further, it is preferable that the protrusion length of the other member 4 is equal to or greater than the sum of the upset distance and the thickness of the burr 8. Since the burr 8 is formed around the joined interface 6, when the protrusion length of the other member 4 having the smaller end surface area is equal to or greater than the sum of the upset distance and the thickness of the burr 8, it is possible to prevent the interference between the fixing jig 10 for fixing the material to be joined onto the linear friction-joining apparatus and the burr 8. On the other hand, as long as the effect of the present invention is not impaired, for the purpose of crushing the burr 8 with the fixing jig 10 or the like, it may be intentionally set to satisfy the condition of "sum of upset distance and thickness of burr>protrusion length upset distance".

Further, it is preferable that a thermal conductivity of the one member 2 and/or the other member 4 is 10 W/mK or more. When the thermal conductivity of the one material 2 and/or the other material 4 is 10 W/mK or more, the burr 8 discharged from the member having the smaller end surface area is more remarkably, and the relationship between the protrusion length and the upset distance of the member having the smaller end surface area becomes more direct. As a result, the effects of the present invention can be exhibited more clearly. The thermal conductivity is more preferably 20 W/mK or higher, most preferably 30 W/mK or higher. Here, strictly speaking, the thermal conductivity at each temperature from room temperature to the joining temperature contributes to the joining phenomenon, but in the linear friction-joining of the present invention, since the temperature is raised only at the interface to be joined and the extreme vicinity thereof, the thermal conductivity at room temperature (300K) is important. Therefore, in the present invention, the thermal conductivity means the thermal conductivity at 300K. Table 1 shows the thermal conductivity at 300K of typical metal materials.

TABLE 1

| Metal material | Thermal conductivity [W/MK] |
|---|---|
| α-β Titanium alloy (Ti—6Al—4V) | 7.5 |
| β Titanium alloy (Ti-15-3-3-3) | 8.1 |
| Hastelloy C (Mo: 16, Cr: 15, W: 4, Fe: 5) | 11.1 |
| Incoly 800 (Fe: 45, Cr: 21, Ti: 0.4, Ni-based) | 11.5 |
| Inconel X-750 (Cr: 15, Fe: 7, Ti: 2.5, Al: 0.6, Nb: 0.8, Ni-based) | 12.0 |
| Austenic stainless steel (Cr: 15, Ni: 10, Mn: 6, Mo: 1) | 12.8 |
| Heat-resistant cast steel (Ni: 35, Cr: 15, corresponding to SUH 330) | 13.0 |
| Inconel 600 (Cr: 16, Fe: 6, Ni-based) | 14.8 |
| Heat-resistant cast steel (Cr: 25, Ni: 20, corresponding to SUH 310) | 15.9 |
| Austenic stainless steel SUS 304 (Cr: 18, Ni: 8) | 16.0 |
| Nodular graphite cast iron (C: 3.46, Si: 2.72, perlite and others) | 20.1 |
| Martensic stainless steel (C: 0.13, Cr: 12.95, Ni: 0.14) | 26.9 |
| Ferritic stainless steel SUS 405 (C: 0.08, Cr: 13) | 27.0 |
| Mechanical structural carbon steel S35C (C: 0.34) | 43.0 |
| Tool steel (C: 1.22, Cr: 0.11, Ni: 0.13) | 45.1 |
| Eutectoid steel (C: 0.8, Mn: 0.32) | 49.3 |
| Aluminum bronze cast C95200 (Fe: 3, Al: 9) | 50.0 |
| Medium-carbon steel (C: 0.4) | 51.5 |
| Mild steel (C: 0.23, Mn: 0.6) | 51.6 |
| Magnesium expanded material AZ80A (Al: 8.5, Zn: 0.5, Mn: 0.12) | 78.0 |
| Aluminum diecast ADC10 (Si: 8.5, Cu: 3.5) | 96.2 |
| Aluminum diecast ADC12 (Si: 11, Cu: 2.5) | 96.3 |
| Magnesium casting material ZE63A (Zn: 5.8, RE: 2.6, Zr: 0.7) | 109.0 |
| Zinc diecast ZDC1 (Al: 4, Cu: 1, Mg: 0.04) | 109.0 |
| Zinc diecast ZDC2 (Al: 4, Mg: 0.04) | 113.0 |
| Super duralumin expanded material A2024-T4 (Cu: 4.5, Mg: 1.5, Mn: 0.6) | 120.0 |
| 7/3 Brass (Zn: 30) | 121.0 |
| 6/4 Brass (Zn: 40) | 123.0 |
| Corrosion-resistant aluminum expanded material A5154 (Mg: 3.5, Cr: 0.25) | 127.0 |
| Extra super duralumin A7075 (Zn: 5.6, Mg: 2.5, Cu: 1.6, Cr: 0.3) | 130.0 |
| Aluminum alloy expanded material A3003 (Mn: 1.2, Cu: 0.12) | 193.0 |
| Aluminum 6063-T6 | 200.0 |
| Copper expanded material ASTM-C14500 (Te: 0.5) | 355.0 |
| Copper wire material C16200 (Cd: 1) | 360.0 |

Further, it is preferable that the one member 2 and/or the other member 4 is any one of ferrous metals, aluminum, aluminum alloys, magnesium, magnesium alloys, copper and copper alloys. Although these metal materials have higher thermal conductivity than titanium alloys, which have been studied as materials to be joined by linear friction-joining, and are difficult to join by linear friction-joining, a good joint can be produced efficiently by using the linear friction-joining of the present invention. Further, each metal material is an important structural metal material, and the linear friction-joined joint can be used for various purposes.

Further, it is preferable that the one member 2 and the other member 4 are made of different materials. In particular, by selecting materials for the one member 2 and the other member 4 so that the strength of the other member 4 having the smaller end area is low at a desired joining temperature, since the burr 8 is more reliably discharged only from the other member 4, the joining conditions of the linear friction-joining method of the present invention can be precisely applied.

The linear friction-joining conditions such as amplitude, frequency and joining pressure are not particularly limited as long as the effects of the present invention are not impaired, and conventionally known joining conditions can be used, and it is preferable that the joining pressure is set to be equal to or higher than the yield stress and equal to or lower than the tensile strength of the one member 2 and/or the other member 4 at a desired joining temperature. When setting the joining pressure to be equal to or higher than the yield stress and equal to or lower than the tensile strength of the one member 2 and/or the other member 4 at a desired joining temperature, the joining temperature can be accurately controlled.

Further, members to be joined by one linear friction-joining are not limited to two members, and, for example, a third member may be joined by the linear friction-joining to the interface where two members are butted to join the three members integrally.

(2) Linear Friction-Joined Structure

Figure 4:
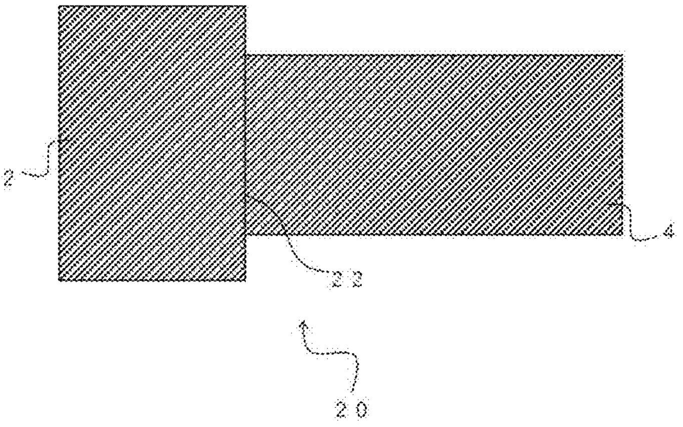
FIG. 4 is a schematic diagram which shows one example of the linear friction-joined structure of the present invention.

FIG. 4 is a schematic cross-sectional view showing an example of the linear friction-joined structure of the present invention. The linear friction-joined structure 20 is obtained by linear friction-joining the one member 2 and the other member 4 having different shapes and/or sizes.

The one member 2 and the other member 4 are integrated through the linear friction-joined interface 22, and the end surface of the one member 2 and the end surface of the other member 4 forming the linear friction-joined interface 22 have different areas. FIG. 4 shows the case where the area of the end surface of the other member 4 is smaller.

Here, FIG. 4 shows the state in which the burr discharged during the linear friction-joining process has been removed by cutting or the like, but when the burr remains, it is preferable that the burr is removed mainly from the other member 4. The state of the removal of the burr can be easily confirmed by observing the cross section of the joined portion. For example, by observing the material flow at the time of linear friction-joining by EBSD measurement or the like in the cross section of the joined portion, even if the burr has been removed, it is possible to confirm the discharge state of the burr.

Further, the thermal conductivity of the one member 2 and/or the other member 4 is 10 W/mK or more. As long as the thermal conductivity of the one member 2 and/or the other member 4 is 10 W/mK or more, it is possible to use conventionally known various metal materials as the materials to be joined, it is preferable to use any one of ferrous metals, aluminum, aluminum alloys, magnesium, magnesium alloys, copper and copper alloys. The linear friction-joined structure 20 forms a good joined portion even when containing metal materials other than a titanium alloy which facilitates easy linear friction-joining.

Further, in the linear friction-joined structure 20, it is preferable that the area of the linear friction-joined interface 22 is 70% or more of the area of the end surface of the other member 4. When the end surface of the one member 2 and the end surface of the other member 4 which form the linear friction-joined interface 22 have a different areas, although it is difficult to sufficiently enlarge the linear fraction-joined interface 22, since the linear fraction-joined interface 22 having 70% or more of the area of the end surface of the member 4 is formed, the strength and reliability of the joined portion are sufficiently ensured.

The linear friction-joined structure 20 is not limited to two members joined via the linear friction-joined interface 22, and, for example, three or more members may be joined via the linear friction-joined interface 22.

Although the typical embodiments of the present invention have been described above, the present invention is not limited to these, and various design changes are possible, and all of these design changes are included in the technical scope of the present invention.

EXAMPLE

Example 1

Figure 5:
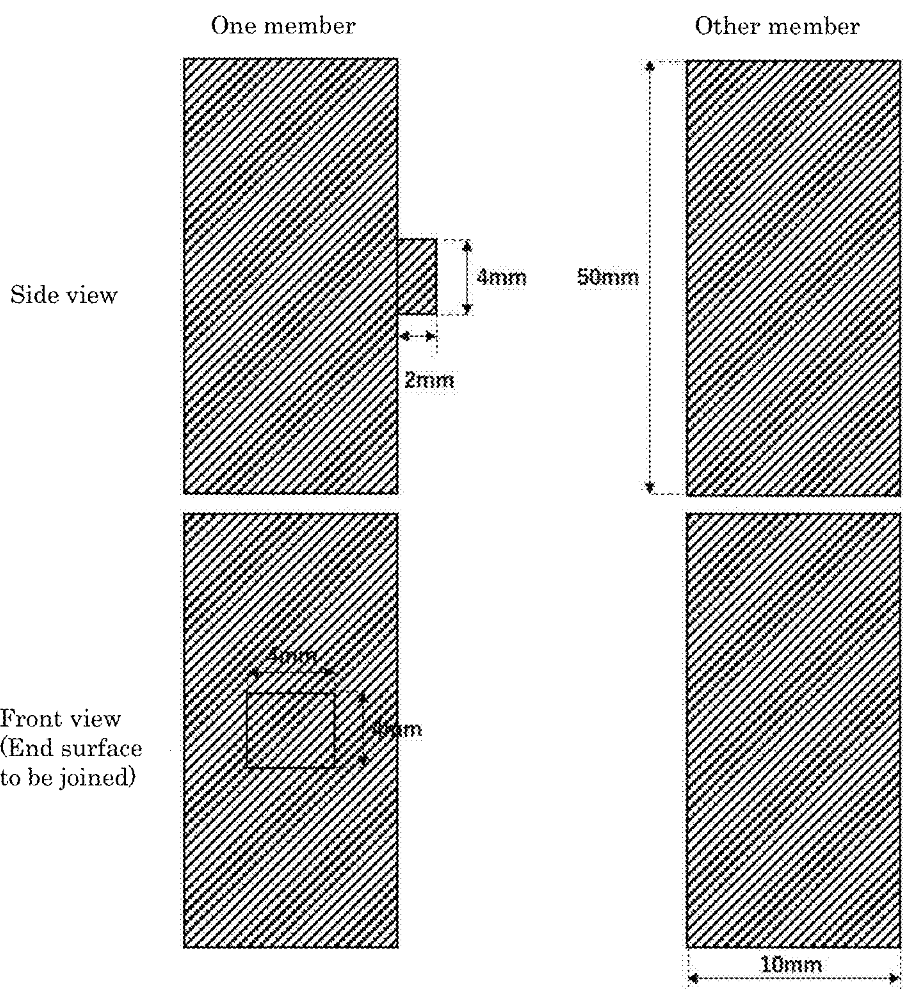
FIG. 5 is a schematic diagram which shows the shape and size of the test material used in Example 1.

As test materials, oxygen-free copper materials (C1020) having the shape shown in FIG. 5 were used. One of the oxygen-free copper material was provided with a projecting portion of 2 mm×4 mm×4 mm, and the projecting portion was defined as a "material to be joined with a protrusion length of 2 mm and an interface to be joined of 4 mm×4 mm", and the projecting portion was linear friction-joined to the end surface of the other oxygen-free copper material. The shape and size of the oxygen-free copper materials other than the projecting portion were the same, and the surfaces to be opposed during the joining were 50 mm×10 mm.

Figure 6:
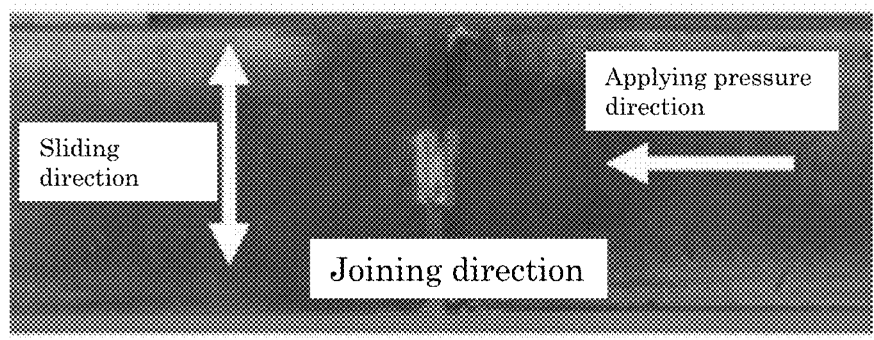
FIG. 6 is an appearance photograph of the linear friction-joined joint obtained in Example 1.

The linear friction-joining conditions were joining pressure: 100 MPa, frequency: 50 Hz, amplitude: 0.5 mm, and upset distance: 1 mm. The photograph of the appearance of the resulting linear friction-joined joint is shown in FIG. 6. It can be seen that the projecting portion was joined to the oxygen-free copper surface of 50 mm×10 mm, and a good linear friction-joined joint was obtained. Further, when the state of burr was observed, it was found that the burr was mainly discharged in the direction substantially perpendicular to the sliding direction of the linear friction-joining.

Further, when the average thickness of the burr was measured, it was 1 mm. Here, since the protrusion length of the member having the smaller end surface area was 2 mm, the protrusion length is larger than the upset distance (1 mm), which is the sum of the thickness of the burr and the upset distance.

Example 2

As test materials, SS400 plates of 40 mm×40 mm×8.8 mm (material 1 to be joined) and two SS400 plates of 50 mm×100 mm×4.4 mm (material 2 to be joined) were used. After the 50 mm×4.4 mm surfaces of the materials 2 to be joined were combined to form a 100 mm×100 mm×4.4 mm surface, the 40 mm×40 mm surface of the material 1 to be joined was brought into contact with the 100 mm×100 mm surface of the material 2 to be joined, and then, the linear friction-joining was performed. The materials were so arranged that the butt line of the material 2 to be joined might become the center of the material 1 to be joined.

Figure 7:
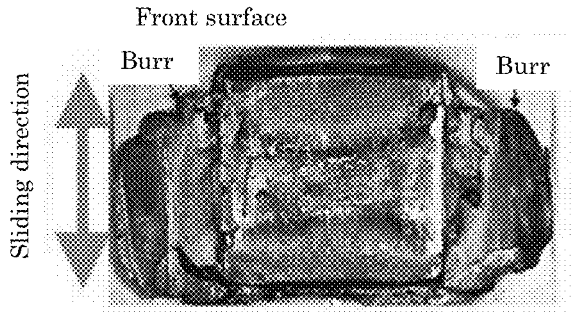
FIG. 7 is an appearance photograph of the linear friction-joint joint obtained in Example 2.
Figure 7:
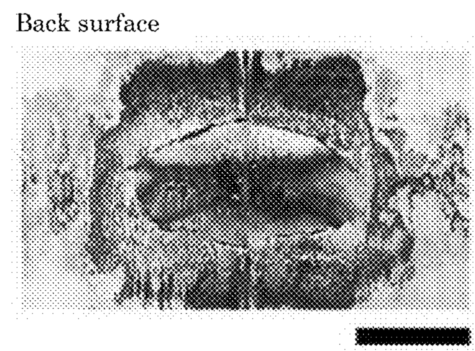

FIG. 7 shows the photograph of the appearance of the joint obtained under the linear friction-joining conditions of joining pressure: 100 MPa, frequency: 30 Hz, amplitude: 1 mm, upset distance: 2 mm, and projecting length of the material 1 to be joined of 2 mm. In the appearance of the surface, it can be seen that burr is discharged substantially perpendicularly to the sliding direction of the linear friction-joining. Further, in the appearance of the back surface, discoloration due to the joining is small at the upper end and the lower end in the sliding direction. On the other hand, in the center portion, a similar state is formed up to the end portion perpendicular to the sliding direction, and it is assumed that the material 1 to be joined slides slightly along an arcuate track during the linear friction-joining. In the embodiment, the protrusion length of 2 mm of the member having the smaller end surface area is the same value as the upset distance.

Example 3

Figure 8:
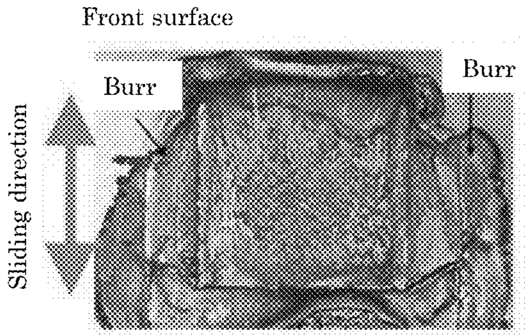
FIG. 8 is an appearance photograph of the linear friction-joint joint obtained in Example 3.
Figure 8:
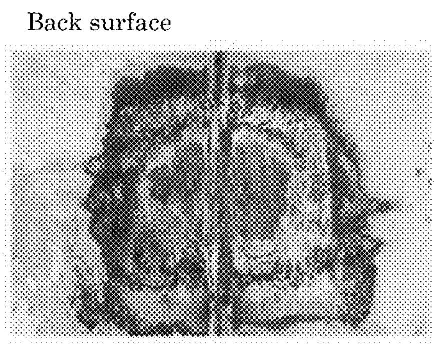

The linear friction-joining was performed in the same manner as in Example 2, except that the frequency of the linear friction-joining was set to 50 Hz. The photograph of the appearance of the obtained joint is shown in FIG. 8.

As in the case of Example 2, in the appearance of the surface, it can be seen that burr is discharged substantially perpendicularly to the sliding direction of the linear friction-joining. Further, in the appearance of the back surface, discoloration due to the joining is small at the upper end and the lower end in the sliding direction. Here, on the back surface, when compared with the case of Example 2, the discolored region corresponding to the joining region is expanded up and down, which is considered to be caused from the reason that the temperature rising rate during the linear friction-joining increased due to the increase in frequency.

Example 4

Figure 9:
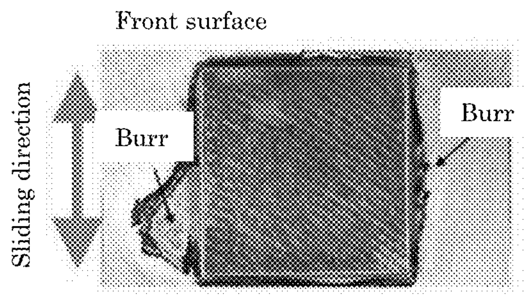
FIG. 9 is an appearance photograph of the linear friction-joint joint obtained in Example 4.
Figure 9:
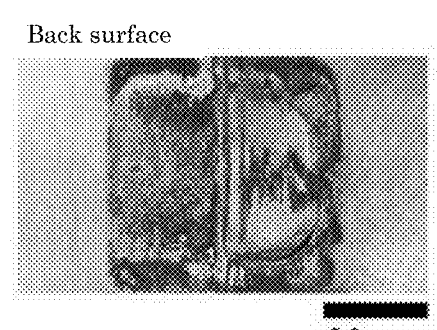

The linear friction-joining was performed in the same manner as in Example 2, except that the joining pressure of the linear friction-joining was set to 200 MPa. The photograph of the appearance of the obtained joint is shown in FIG. 9.

As in the cases of Example 2 and Example 3, in the appearance of the surface, it can be seen that burr is discharged substantially perpendicularly to the sliding direction of the linear friction-joining. The reason why the burr discharge decreases is due to the lowering in joining temperature that accompanies the increase in joining pressure. Further, since the joining temperature is low in comparison with those in Example 2 and Example 3, it is difficult to determine the joining state from the appearance of the back surface.

Example 5

Figure 10:
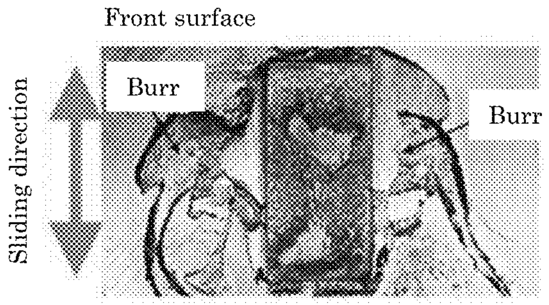
FIG. 10 is an appearance photograph of the linear friction-joint joint obtained in Example 5.
Figure 10:
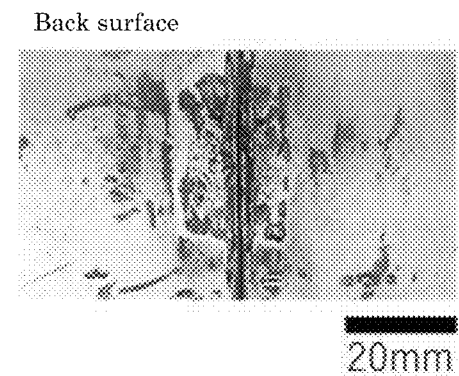

The linear friction-joining was performed in the same manner as in Example 2 except that the shape of the material 1 to be joined was 20 mm×40 mm×8.8 mm and the material was slid in the longitudinal direction. The photograph of the appearance of the obtained joint is shown in FIG. 10.

As in the cases of Example 2 to Example 4, in the appearance of the surface, it can be seen that burr is discharged substantially perpendicularly to the sliding direction of the linear friction-joining. Further, in the appearance of the back surface, the discolored portion due to the formation of the joined region having a width approximately equal to that of the test material and a length of around 80% of the test material is observed. This state indicates that the linear friction-joined interface is formed in around 80% of the area of the end surface of the smaller test material.

Comparative Example 1

The linear friction-joining was performed in the same manner as in Example 1, except that the upset distance was set to 2.5 mm, 2.4 mm, 2.3 mm, 2.2 mm, and 2.1 mm. In all cases, the projecting portions almost disappeared during the linear friction-joining and good joints could not be obtained.

Figure 11:
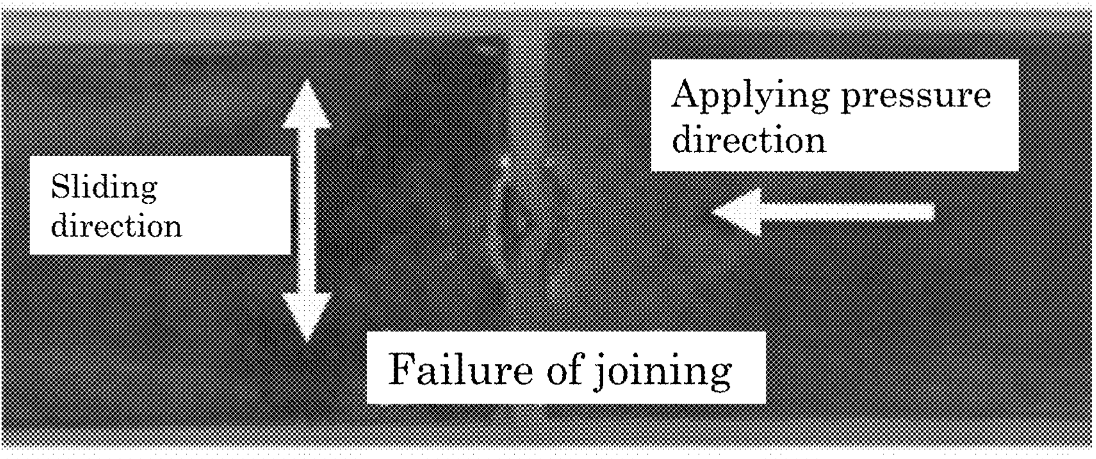
FIG. 11 is an appearance photograph of the linear friction-joint joint obtained in Comparative Example 1.

FIG. 11 shows the photograph of the appearance of the test material after the linear friction-joining when the upset distance was 2.1 mm. It can be seen that the formation of the heat-affected portion in the test material is recognized, but any joined portion is not formed at all.

EXPLANATION FO SYMBOLS

2 . . . One member,

4 . . . Other member,

6 . . . Interface to be joined,

8 . . . Burr,

10 . . . Fixing jig,

20 . . . Linear friction-joined structure,

22. Linear friction-joined interface.

The invention claimed is:

1. A linear friction-joining method which comprises:

a first step of forming an interface to be joined by bringing an end surface of one member into contact with an end surface of an other member while each of the one member and the other member is fixed to a linear friction-joining apparatus by a fixing jig;

a second step of repeatedly sliding the one member and the other member on the same trajectory to discharge burr from the interface to be joined while applying a pressure substantially perpendicular to the interface to be joined; and a third step of stopping the sliding to form a joined surface;

wherein an entire area of an entirety of the end surface of the other member is smaller than an entire area of an entirety of the end surface of the one member, a total length of the one member and the other member in a direction in which the pressure is applied immediately after the third step is shorter than a total length of the one member and the other member in the direction in which the pressure is applied after the first step and before the second step, and the linear friction-joining method further comprises setting a protrusion length of the other member and an upset distance such that the protrusion length of the other member is equal to or larger than an upset distance, the protrusion length being a length of a material to be joined protruding to a side of the interface from the fixing jig at the first step, the upset distance being a difference between the total length of the one member and the other member in the direction in which the pressure is applied after the first step and before the second step and the total length of the one member and the other member in the direction in which the pressure is applied immediately after the third step.

2. The linear friction-joining method according to claim 1, wherein the amount of burr discharged in the direction substantially perpendicular to the sliding direction is larger than the amount of burr discharged in the direction substantially parallel to the sliding direction.

3. The linear friction-joining method according to claim 1, wherein, with respect to the other member, the length in the direction substantially perpendicular to the sliding direction is made shorter than the length in the direction substantially parallel to the sliding direction.

4. The linear friction-joining method according to claim 1, wherein a thermal conductivity of the one member and/or the other member is 10 W/mK or more.

5. The linear friction-joining method according to claim 1, wherein the one member and/or the other member is any one of ferrous metals, aluminum, aluminum alloys, magnesium, magnesium alloys, copper and copper alloys.

6. The linear friction-joining method according to claim 1, wherein the protrusion length is equal to or greater than the sum of the upset distance and the thickness of the burr.

7. The linear friction joining method according to claim 1, wherein the one member and the other member are made of different materials.

8. The linear friction-joining method according to claim 7, wherein the materials of the one member and the other member are selected so that the strength of the other member is lower than the strength of the one member at a desired joining temperature.

9. The linear friction-joining method according to claim 1, wherein the pressure is set to be equal to or higher than the yield stress and equal to or lower than the tensile strength of the one member and/or the other member at a desired joining temperature.

10. The linear friction-joining method according to claim 1, wherein the protrusion length is set to be equal to or greater than the upset distance and less than the sum of the upset distance and the thickness of the burr.

* * * * *